Jan. 12, 1971   IWAO YAMAGISHI   3,554,827
METHOD OF FORMING A DECORATIVE PANEL
Filed Nov. 12, 1968

INVENTOR.
IWAO YAMAGISHI
BY
William G. Babcock
ATTORNEY

United States Patent Office 3,554,827
Patented Jan. 12, 1971

3,554,827
METHOD OF FORMING A DECORATIVE PANEL
Iwao Yamagishi, Osaka, Japan, assignor to Eidai Sangyo Kabushiki Kaisha, Sumiyoshiku, Osaka, Japan, a corporation
Filed Nov. 12, 1968, Ser. No. 774,875
Int. Cl. B32b *3/30, 31/32, 31/24*
U.S. Cl. 156—85                              5 Claims

ABSTRACT OF THE DISCLOSURE

A panel including a sheet, on at least one surface thereof a first selected design is defined, which design is overlaid by a layer of polymerizable resin in which a second indented design is formed.

The panel of the present invention is formed by defining the second design with a polymerization retarding agent on the surface of the sheet on which the first design exists, coating the surface on which the first and second designs are defined with a layer of transparent polymerizable resin that contracts when cured, subjecting the sheet to a resin polymerizing environment to first cure the portions of the resin that are out of contact with the retarding agent and then cure the resin in contact with the retarding agent. The second indented design is formed due to the time differential in curing those portions of the layer of resin in contact with, and out of contact with, the polymerization retarding agent.

BACKGROUND OF THE INVENTION

Field of the invention

A decorative panel that includes a sheet having a first design defined on a first surface thereof, which first surface is overlaid with a coating of transparent polymerizable resin in which a second indented design is formed, and the method of manufacturing said panel.

Description of prior art

In the past, in making indented patterns on the surface of a decorative panel, the panel has been formed by an embossing process in which either an unevenly patterned metallic roll is used, or in which an unevenly indented plate is employed, to impart a desired indented design to a polymerizable resin sheet under pressure and elevated temperature conditions.

The operational disadvantages of previous embossing process has been that the rolls and plates are difficult to prepare and are accordingly excessively expensive, particularly where the desired indented second design is small, such as in the reproduction of wood pores, and the like.

The present invention eliminates the necessity of preparing embossing rolls and plates for pressure application of a selected indented design to a polymerizable resin sheet, with a substantiall saving in labor and manufacturing costs.

SUMMARY OF THE INVENTION

A decorative panel and method of forming the same by defining a first desired design on a first surface of a sheet and then applying a polymerization retarding agent to the first surface to form a second desired design thereon. The first surface is thereafter coated with a polymerizable resin that contracts when it is cured. The resin-coated sheet is then subjected to a polymerizing environment, such as a heated oven.

Those portions of the resin out of contact with the retarding agent cure first, and as these portions contract, the portions of the resin above the second design are stretched and thinned out. The thinned-out portions of the resin define the indented second design in the cured resin.

A major object of the present invention is to provide a decorative panel on which a first design and a second indented design are defined, with said panel being formed without the use of expensive embossed plates and rolls for pressure-formation of the desired second indented design in a heated layer of a polymerized resin.

Another object of the invention is to provide a process by which a first design and a second indented design may be formed by the use of conventional printing rolls on a panel, with a substantial saving in time and expense over that entailed in carrying out the process by previously available equipment.

A still further object of the invention is to supply a process for forming a decorative panel incorporating a first design and second indented design thereon that is simple to perform, and requires the use of only conventional equipment and readily obtainable commercial materials.

SUMMARY OF THE INVENTION

Figure 5:
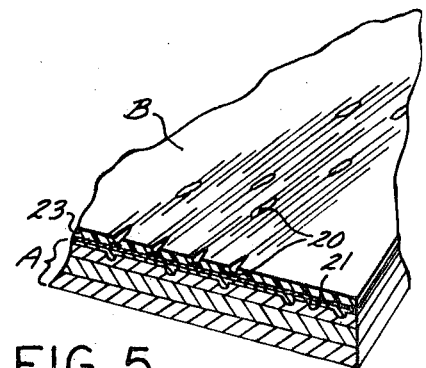
FIG. 5 is a perspective view of a section of a first form of decorative panel made by use of the invention.
Figure 6:
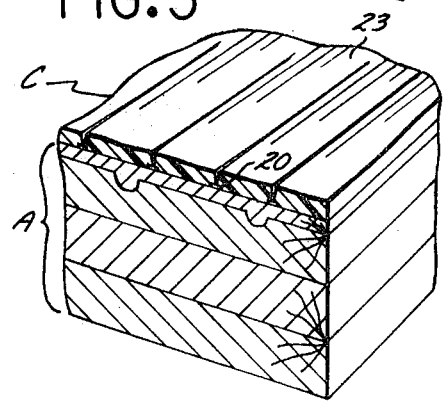
FIG. 6 is a perspective view of a section of a second form of decorative panel made by use of the invention.
Figure 7:
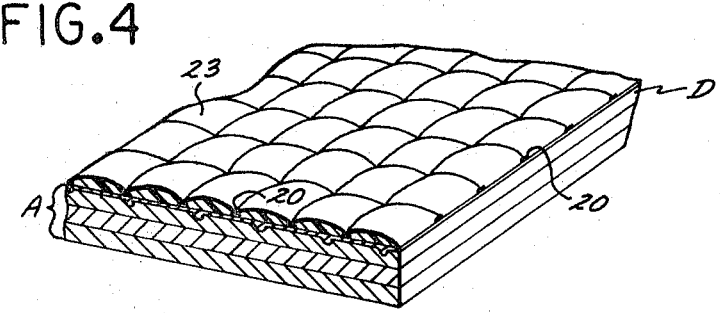
FIG. 7 is a perspective view of a section of a third form of decorative panel made by use of the invention.

The sheet A that is to serve as a base in the manufacture of the decorative panels B, C, and D, shown in FIGS. 5, 6, and 7, may be of any desired material. The sheet A may be veneer board, particle board, plywood, or the like.

Figure 1:
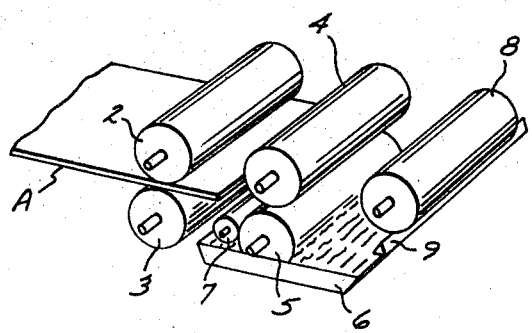
FIG. 1 is a perspective view of an apparatus by which a filler coating is applied to a first surface of a sheet to provide a smooth, blank surface thereon.

Frequently such sheets A will have uneven surfaces, or a grain structure that is unattractive in appearance. When it is desired to provided the sheet A with a smooth surface or to conceal the unattractive natural grain structure thereof, the sheet is subjected to the action of the apparatus illustrated in FIG. 1. Two power-driven delivery rollers 2 and 3 grip the sheet A and move the same to the right, as viewed in FIG. 1. Sheet A subsequently moves between a press roller 4 and coating roller 5.

A liquid filler material such as paint, is contained in a pan 6 and is evenly applied to coating roller 5 by a second roller 7 that is in contact with the coating roller. The filler is transferred from coating roller 5 to the under surface of sheet A. After application of the filler material to sheet A, the sheet passes between a second press roller 8 and a transverse strip 9 of resilient material. The spacing between the second press roller 8 and strip 9 determines the thickness of the layer of filler material that will remain on the sheet A. After the filler material has been applied to the sheet A, the sheet is subjected to an elevated temperature whereby the filler material is dried.

Should it be desired, a smooth surface may be achieved on the sheet A by applying thin layers of paper, cloth, film, or the like (not shown) thereto in lieu of a layer of filler material. Of course, when the sheet A already has a smooth surface, the above described operation may be omitted.

When it is desired to provide a simulated wood panel B, such as shown in FIG. 5, a base coating 21 of paint is applied to the layer of filler material. The coating 21 will be of the appropriate woodlike color, and a grain pattern 22 is then applied to the coating by use of conventional ink.

Figure 2:
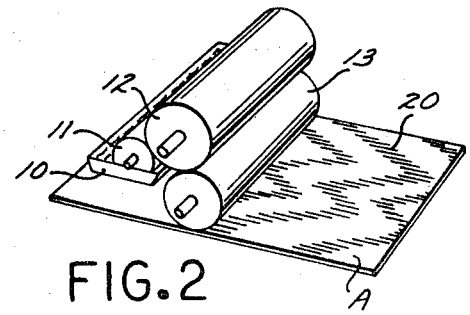
FIG. 2 is a perspective view of an apparatus by which a polymerization retarding agent is applied to said sheet in a selected pattern.

A liquid polymerization retarding agent is contained in a pan 10. A roller 11 dips into the agent contained in pan 10, and is rotated by a cylinder 12 in which the pattern of the indented design is defined. An offset roller 13 contacts cylinder 12. The roller 13 is rotated by frictional contact with sheet A as the sheet moves to the right thereunder in the manner illustrated in FIG. 2. As the sheet A moves to the right, it causes rotation of the rollers 11 and 13, as well as cylinder 12, whereby the retarding agent is applied to the sheet as a second pattern as the sheet so moves.

Figure 3:
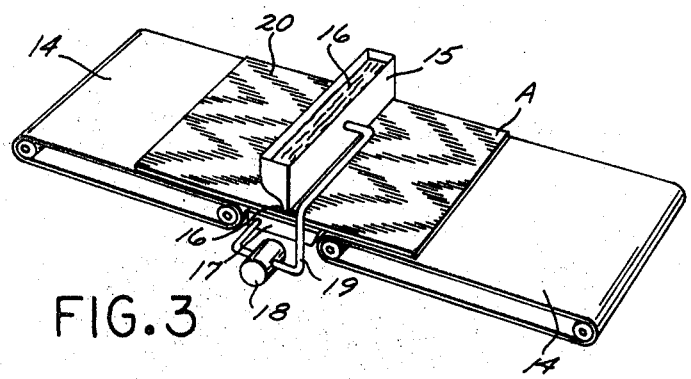
FIG. 3 is a perspective view of an apparatus by which a thick layer of a polymerizable resin that contracts on curing is applied to a first surface of said sheet.

The sheet A on which the grain pattern 22 in a first design and the liquid polymerizing retarding agent in a second design have been applied, is thereafter transferred to a horizontal conveyor 14, as may be seen in FIG. 3. The sheet A then moves to the right (FIG. 3) and a layer 23 of transparent polymerizable resin 16 is applied thereto.

The resin 16 is disposed in an elongate transverse container 15, in the lower portion of which a slitlike aperture is formed. Container 15 is disposed above conveyor 14, and the resin 16 is discharged from the container as a layer 23 of desired thickness onto the surface of sheet A on which the grain pattern 22 and the retarding agent in a desired pattern are defined. Surplus resin 16 flows from sheet A in the manner shown in FIG. 3, into a container 17. A pump 18 discharges resin 16 from container 17 back to the elongate container 15, as also may be seen in FIG. 3.

Figure 4:
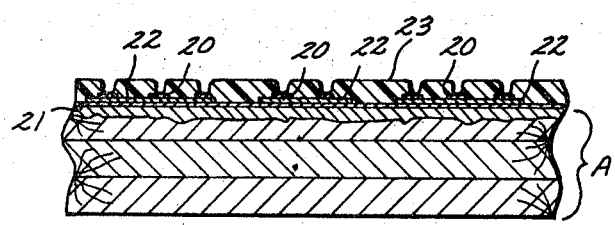
FIG. 4 is an enlarged cross section of a decorative panel made in accordance with the process of the present invention.

The resin-coated sheet A continues to move to the right on conveyor 14 into a resin polymerizing environment (not shown) where by heat, radioactive rays, or other means to which the resin 16 is responsive, the resin is cured. Curing of the resin 16 may be by polymerization or condensation-polymerization. The layer 23 does not cure uniformly, for the curing of those portions of the layer in contact with the retarding agent are the last to cure. As portions of the layer 23 not directly above the design defined by the retarding agent cure, they contract in volume, and move away from one another. Such contraction causes portions of the layer 23 that overlie the retarding agent to be thinned out, with these thinned-out portions defining the indented pattern 20 shown in FIGS. 4 and 5.

Normally, the agent would be a retarding agent, but it may also be an inhibitor or antioxidant, depending upon the curing characteristics of the resin 16 employed.

The materials used in carrying out the process described herein are as follows:

EXAMPLE NO. 1

Filler

| Materials: | Percentage by weight |
| --- | --- |
| Polishing Powder | 65 |
| Water | 31 |
| Gloioplis glue | 4 |

Base coating [1]

| Materials: | Percentage by weight |
| --- | --- |
| Zinc white | 15 |
| Wood color pigment | 15 |
| Nitrocellulose | 8 |
| Ethyl acetate | 10 |
| Butyl acetate | 6 |
| Methyl alcohol | 6 |
| Toluene | 38 |

[1] Diluted with equal quantity of lacquer thinner.

Grain pattern ink

Acetyl cellulose type ink—100%

Indented pattern polymerization retarder

| Materials: | Parts by weight |
| --- | --- |
| Acetyl cellulose type ink | 72 |
| Hydroquinone | 28 |

Transparent resin

| Dry polyester resin | 100 |
| --- | --- |
| Styrene | 15 |
| Methyl ethyl ketone peroxide | 1 |
| Cobalt naphthalene | 1 |

In using the materials of Example No. 1, the filler material E is applied to the sheet A as a layer four millimeters thick, and after it is dry, the base coating is applied. After the base coating is dry, the grain pattern 22 is printed thereon with the grain pattern ink. The indented pattern polymerization retarder F is then printed on the base coating, and the transparent resin 16 thereafter applied to the sheet A to define the layer 23.

Thereafter, the sheet A is heated at 80° centigrade for ten minutes to provide a decorative panel having an indented pattern 20 of a desired configuration formed therein.

EXAMPLE NO. 2

Brown colored base coating

| Materials: | Percentage by weight |
| --- | --- |
| Pigment | 16 |
| Body pigment | 44 |
| Alkyl phenol resin varnish | 15 |
| Gold size | 20 |
| Benzene | 5 |

Polymerization retarding liquid agent

| Materials: | Parts by weight |
| --- | --- |
| Hydroquinone | 14 |
| Dammar | 4 |
| Shellac | 5 |
| Phthalocyanine blue | 20 |
| Xylol solution containing 45% acryl resin | 50 |

Transparent resin

| Air drying polyester resin | 95 |
| --- | --- |
| Methyl ethyl ketone peroxide | 1 |
| Cobalt naphthalene | 0.5 |

After the base coating 21 is applied to the sheet A and dried, the retarding agent F is applied in a desired grain-defining pattern thereto. The resin 16 is then applied as a thick film to overlie the retarding agent pattern. The transparent resin is allowed to harden at room temperature, and thereafter it is heated to 70° centigrade to complete the cure and define an indented pore pattern on the sheet A.

EXAMPLE NO. 3

Grain-defining ink

| Materials: | Parts by weight |
| --- | --- |
| Acetyl cellulose type ink | 70 |
| Hydroquinone | 30 |

Transparent resin

| Polyester resin | 100 |
| --- | --- |
| Styrene | 10 |
| Methyl ethylketone peroxide | 1 |
| Cobalt naphthalene | 1 |

The grain-defining ink is used to form a desired pattern on paper which is attached to the sheet A. The resin 16 is then applied to the paper to form a film thereon. The resin 16 is hardened at ambient temperature, and then cured at 80° centigrade to form an indented decorative panel such as illustrated in FIG. 5.

EXAMPLE NO. 4

Transparent resin

| Materials: | Parts by weight |
|---|---|
| Polyester resin | 10 |
| Styrene | 10 |

The sheet A coated with paper which is processed in the same manner as that described in Example 3 has a film of the above resin appled thereto in an amount of 20 grams per square foot. One minute after application this film is subjected to a beam of 4 mr. radiation from a General Electric Co., Inc. electron accelerator. A decorative panel is produced in which an intended pattern is formed as shown in FIG. 5.

EXAMPLE NO. 5

A thin base materal upon which a cross pattern is printed with the ink composed of 13% 2-mercapt-benzole, 3% dammar, 4% copal, 2% phthalocyanine blue, and 60% of an alkydphenol resin solution, is pasted on a sheet A four millimeters thick, and then an aminoalkyd resin paint having 35% solids is applied thereto in the amount of 13 grams per square foot. It is then heated to harden for thirty minutes to produce a decorative panel having the cross pattern shown in FIG. 7, in which case its textural part of the warp and weft crossing pattern becomes dented and shadowy, while its thick surfaces give a solid appearance as well as tactile sensation.

From the description contained therein it will be seen that a decorative panel may be formed on which a first grain pattern 22 is formed (FIGS. 4 and 5), as well as a second indented pattern 20 which simulates a wood pore structure. Also, a panel may be formed (FIGS. 6 and 7) in which the decorations are merely indented patterns 20 which are defined in the plastic material.

I claim:

1. A method of transforming a sheet of rigid material into a decorative panel, including the steps of:
   (a) applying a liquid polymerization retarding agent to a first surface of said sheet in a desired pattern, which pattern is defined by a plurality of spaced lines;
   (b) applying a layer of transparent polymerizable resin to said sheet to overlie said pattern, which resin contracts in volume when it polymerizes; and
   (c) exposing said sheet and said layer to a resin polymerizing environment, whereupon said resin between said lines polymerizes and contracts in volume, and in so doing, said resin thins out the portions of said layer overlying said lines to define an indented pattern in the exterior surface of said layer of resin.

2. A method as defined in claim 1 which includes the further step of:
   (d) applying a filler coat to said sheet to define said first surface prior to application of said retarding agent to said first surface.

3. A method as defined in claim 1 which includes the further steps of:
   (d) applying a filler coat to said sheet to define said first surface; and
   (e) imprinting a desired design on said first surface prior to application of said liquid polymerizing retarding agent design and said layer of polymerizable thereto.

4. A method as defined in claim 1 wherein said lines are so disposed as to define a lattice pattern.

5. A method as defined in claim 1 which includes the further step of:
   (d) defining said first surface by adhering a film of smooth material to said sheet to provide said first surface.

References Cited

UNITED STATES PATENTS

| 1,971,067 | 8/1934 | Fess | 117—45X |
|---|---|---|---|
| 2,448,357 | 8/1948 | Craig et al. | 156—278X |
| 2,632,753 | 3/1953 | Anderson | 260—866 |
| 3,159,525 | 12/1964 | Finger | 161—232X |
| 3,223,579 | 12/1965 | Dorland et al. | 156—278X |
| 3,365,353 | 1/1968 | Whitman | 161—116 |
| 3,373,072 | 3/1968 | Jones | (161 Emboss) |
| 3,445,312 | 5/1969 | Rider | 161—413X |
| 3,453,171 | 7/1969 | Crowley | 117—38X |
| 3,454,413 | 7/1969 | Miller | 117—38X |

ROBERT F. BURNETT, Primary Examiner

S. M. HOFFMAN, Assistant Examiner

U.S. Cl. X.R.

117—41, 45, 93.31; 156—220, 280; 161—117, 232, 413; 260—866